United States Patent
Takashige et al.

(10) Patent No.: US 10,705,876 B2
(45) Date of Patent: Jul. 7, 2020

(54) OPERATION MANAGEMENT SYSTEM AND OPERATION MANAGEMENT METHOD

(71) Applicant: HITACHI, LTD., Tokyo (JP)

(72) Inventors: Souichi Takashige, Tokyo (JP); Nobuhiro Maki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 16/129,932

(22) Filed: Sep. 13, 2018

(65) Prior Publication Data

US 2019/0258521 A1 Aug. 22, 2019

(30) Foreign Application Priority Data

Feb. 20, 2018 (JP) .................................. 2018-028133

(51) Int. Cl.
*G06F 9/50* (2006.01)
*G06F 3/06* (2006.01)

(52) U.S. Cl.
CPC .......... *G06F 9/5016* (2013.01); *G06F 3/0604* (2013.01); *G06F 3/067* (2013.01); *G06F 3/0631* (2013.01); *G06F 9/5055* (2013.01)

(58) Field of Classification Search
CPC ...... G06F 3/0604; G06F 3/0631; G06F 3/067; G06F 9/5016; G06F 9/5055
See application file for complete search history.

(56) References Cited

U.S. PATENT DOCUMENTS

| | | | |
|---|---|---|---|
| 10,146,465 B1 * | 12/2018 | Peterson | G06F 3/0629 |
| 10,223,025 B1 * | 3/2019 | Faibish | G06F 3/0644 |
| 10,305,954 B1 * | 5/2019 | Faibish | H04L 65/602 |
| 2012/0297381 A1 | 11/2012 | Ambat et al. | |
| 2014/0115579 A1 * | 4/2014 | Kong | G06F 3/0605 718/1 |
| 2015/0317556 A1 * | 11/2015 | Huang | G06N 3/08 706/23 |
| 2016/0269317 A1 * | 9/2016 | Barzik | H04L 47/805 |
| 2017/0192681 A1 * | 7/2017 | Aloni | G06F 3/0619 |
| 2017/0195419 A1 * | 7/2017 | Atia | H04L 67/1097 |
| 2017/0242610 A1 * | 8/2017 | Atia | G06F 3/0689 |
| 2017/0286144 A1 * | 10/2017 | Barzik | G06F 9/45558 |
| 2018/0089040 A1 * | 3/2018 | Elron | G06F 3/0653 |
| 2018/0324038 A1 * | 11/2018 | John | H04L 41/0803 |

* cited by examiner

Primary Examiner — Ryan Bertram
(74) Attorney, Agent, or Firm — Baker Botts L.L.P.

(57) ABSTRACT

An SDS node adjusts a physical capacity included in a logical volume provided to a tenant and is to be allocated to the tenant, based on the size of data written from the tenant. An operation management system provides storage to the tenant and adjusts the provided storage to include a node and a capacity allocation and recovery system. The node provides the logical volume of the storage to the tenant, receives writing of data to the logical volume from the tenant, and writes the received data to a region included in the storage and having the physical capacity allocated to the tenant. The capacity allocation and recovery system determines a physical capacity to be interchanged based on the size of the logical volume, the size of the written data, and the physical capacity allocated to the tenant, and notifies information on the determined physical capacity to the node.

13 Claims, 11 Drawing Sheets

FIG. 5

SHORTAGE RATE SETTING INFORMATION (21)

| TENANT IDENTIFIER (500) | PERMITTED SHORTAGE RATE (501) | GRADE GROUP (502) | GRADE PRIORITY (503) | REMARKS (504) |
|---|---|---|---|---|
| TENANT A | 0% | 001 | 1 | GOLD GRADE |
| TENANT B | 50% | 002 | 2 | SILVER GRADE |
| TENANT C | 50% | | | |
| TENANT D | 200% | 003 | 3 | BRONZE GRADE |
| TENANT E | 200% | | | |
| TENANT F | 200% | 004 | 3 | BRONZE GRADE |
| TENANT G | 200% | | | |
| ... | ... | ... | ... | ... |

FIG. 6

PHYSICAL CAPACITY ALLOCATION INFORMATION ON EACH SDS NODE (22)

| TENANT IDENTIFIER (600) | SDS NODE X (601) | SDS NODE Y (602) | SDS NODE Z (603) | ... |
|---|---|---|---|---|
| TENANT A | 50GB | 30GB | 40GB | ... |
| TENANT B | 1GB | 10GB | 6GB | ... |
| TENANT C | 1GB | 180GB | 200GB | ... |
| ... | ... | ... | ... | ... |

FIG. 7

| TENANT IDENTIFIER | SDS NODE X | SDS NODE Y | SDS NODE Z | ... |
|---|---|---|---|---|
| TENANT A | I-XA | I-YA | I-ZA | ... |
| TENANT B | I-XB | I-YB | I-ZB | ... |
| TENANT C | I-XC | I-YC | I-ZC | ... |
| ... | ... | ... | ... | ... |

TENANT-INSTANCE ASSOCIATION INFORMATION (23)

700, 701, 702, 703

OPERATION MANAGEMENT SYSTEM AND OPERATION MANAGEMENT METHOD

CLAIM OF PRIORITY

The present application claims benefit of priority to Japanese Patent Application No. 2018-028133, filed on Feb. 20, 2018, the content of which is hereby incorporated by reference into this application.

BACKGROUND

The present invention relates to an operation management system and an operation management method.

There is a storage provision service for building scalable storage pools using software defined storage (SDS) and providing the storage pools for physical capacities whose overcommit ratios vary depending on the grades of users' tenants in a cloud environment.

For example, there is a technique for building Ceph instances in Kubernetes and providing a (storage) pool for each tenant. In addition, U.S. Unexamined Patent Application Publication No. 2012/0297381 describes a technique for dividing IO performance and a cache using virtual machines (VMs) different for customers to provide storage functions (pools) to the different customers (tenants).

SUMMARY

When the technique described in U.S. Unexamined Patent Application Publication No. 2012/0297381 is used, different storage functions can be provided to customers.

However, a certain customer uses a large storage region (physical capacity) of a provided pool (logical volume), while another customer does not use a storage region much. When an overcommit ratio is simply allocated, the efficiency of using a physical capacity may be reduced. A technique for the reduction in the usage efficiency is not described in U.S. Unexamined Patent Application Publication No. 2012/0297381.

An object of the invention is to use an SDS node to adjust a physical capacity that is included in a logical volume to be provided to a tenant and is to be allocated to the tenant, based on the size of data written from the tenant.

To solve the aforementioned problem, a representative operation management system according to the invention provides a function of storage to a tenant and adjusts the provided function of the storage. The operation management system includes a node and a capacity allocation and recovery system. The node provides a logical volume of the storage to the tenant, receives writing of data to the logical volume from the tenant, and writes the received data to a region included in the storage and having a physical capacity allocated to the tenant. The capacity allocation and recovery system determines a physical capacity to be interchanged, based on the size of the logical volume, the size of the written data, and the physical capacity allocated to the tenant, and notifies information on the determined physical capacity to the node.

According to the invention, an SDS node is used to adjust a physical capacity included in a logical volume to be provided to a tenant, based on the size of data written from the tenant, and an overcommit ratio is adjusted.

BRIEF DESCRIPTION OF THE DRAWINGS

FIG. 5 is a diagram showing an example of shortage rate setting information;

FIG. 6 is a diagram showing an example of physical capacity allocation information on each SDS node;

FIG. 7 is a diagram showing an example of tenant-instance association information;

DETAILED DESCRIPTION

Figure 1:
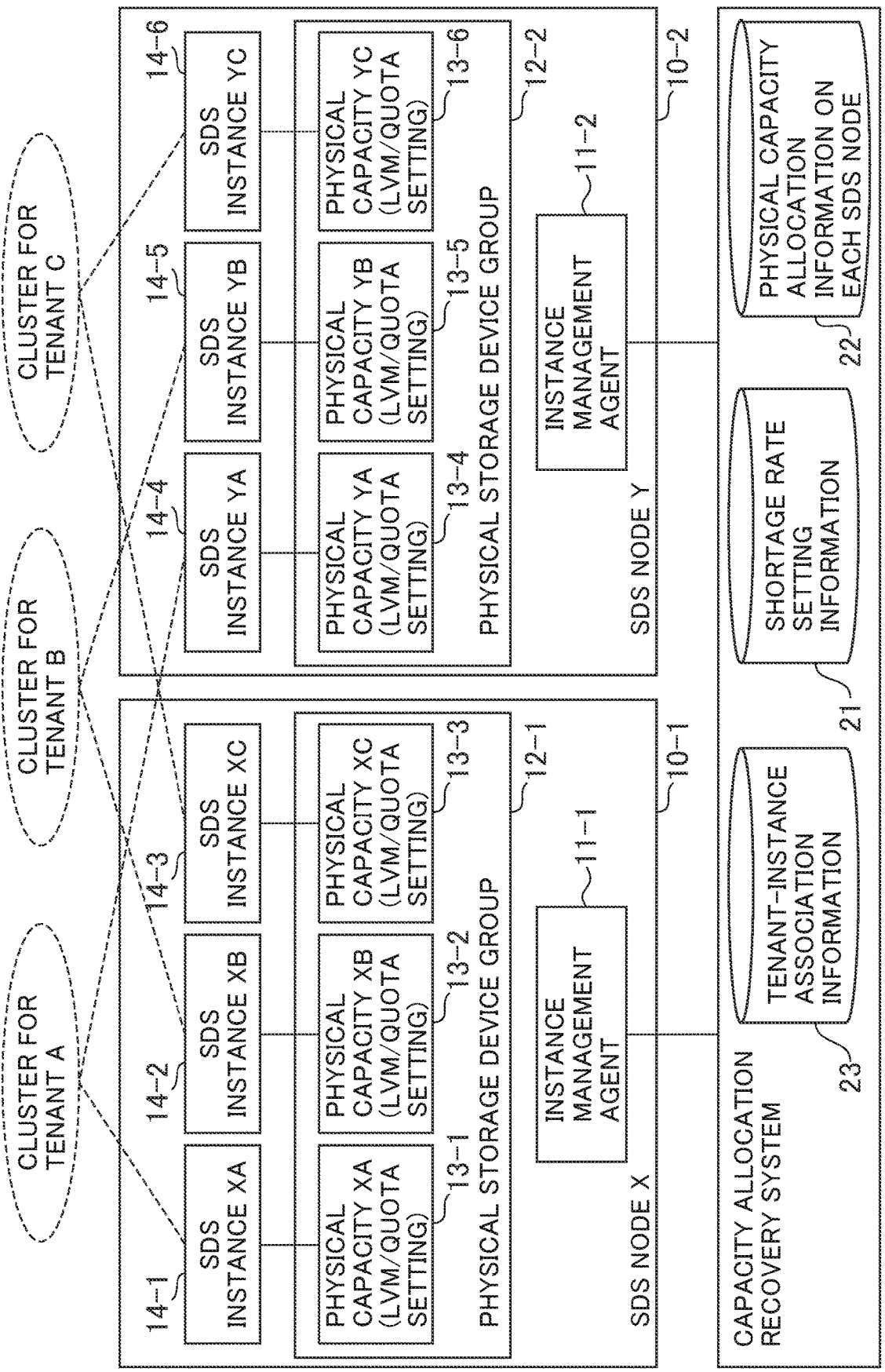
FIG. 1 is diagram showing an example of an operation management system.

FIG. 1 shows an example of a storage service and an operation management system. The operation management system uses at least one computer (server) as a cluster. The operation management system includes SDS nodes 10 and a capacity allocation/recovery system 20 (capacity allocation and recovery system). In the SDS nodes 10, SDS software is executed. The capacity allocation/recovery system 20 communicates with the SDS nodes 10 and changes the allocation of SDS instances while adjusting overcommit ratios.

When the SDS nodes 10-1 and 10-2 are not distinguished and a single SDS node is representatively described, a hyphen and an index are not used and the SDS node is referred to as SDS node 10. The same applies to other reference symbols.

A storage function is provided by each SDS node 10 to a tenant (cloud user). Each SDS node 10 is a single physical server, but may be composed of multiple physical servers.

An identifier "SDS node X" is given to the SDS node 10-1, while an identifier "SDS node Y" is given to the SDS node 10-2. In the example shown in FIG. 1, in the SDS node 10-1, three SDS instances 14-1 to 14-3 are executed to provide storage functions. Three physical capacities 13-1 to 13-3 are allocated to the three SDS instances 14-1 to 14-3, respectively.

The three physical capacities 13-1 to 13-3 included in a physical storage device group 12-1 of the SDS node 10-1, which is the physical server, are allocated in accordance with control by an instance management agent 11-1. In addition, to control the allocation, the instance management agent 11-1 receives information on the change from the capacity allocation/recovery system 20.

Each of the physical capacities 13-1 to 13-3 may be managed by logical volume management (LVM) or managed by quota setting. In the example shown in FIG. 1, the configuration of the SDS node 10-2 is the same as that of the SDS node 10-1. The number of SDS instances 14-4 to 14-6 included in the SDS node 10-2 and the number of physical capacities 13-4 to 13-6 included in the SDS node 10-2 may be different from the number of SDS instances included in the SDS node 10-1 and the number of physical capacities included in the SDS node 10-1.

The SDS node 10-1 and the SDS node 10-2 use the multiple SDS instances 14 to provide storage functions as clusters to tenants. In an embodiment, destinations to which the storage functions are provided are managed in user group units, which are called tenants. For example, each of the tenants corresponds to a respective one of agreements of corporate departments or the like, while the users correspond to individual users belonging to the departments.

For a single tenant, SDS instances of a single cluster are executed. In other words, the SDS instances of the single cluster are a single independent service for providing a storage function to the tenant.

For example, the SDS instances 14-1 and 14-4 provide a storage function as a cluster for a tenant A, the SDS instances 14-2 and 14-5 provide a storage function as a cluster for a tenant B, and the SDS instances 14-3 and 14-6 provides a storage function as a cluster for a tenant C.

An identifier "SDS instance XA" (hereinafter abbreviated to I-XA) is given to the SDS instance 14-1 included in the SDS node 10-1 of "SDS node X" and constituting the cluster for the tenant A. Identifiers including combinations of identifiers ("X" and the like) of the SDS nodes 10 and identification information ("A" and the like) of the tenants are given to the other SDS instances 14-2 to 14-5 and the physical capacities 13-1 to 13-6.

For example, the SDS instances 14-1 and 14-2 of a single cluster maybe treated as a single SDS instance for the tenant A. Since a single SDS instance can be treated as an SDS instance included in multiple SDS nodes 10, SDS processes are described later as SDS processes independent for each SDS node 10 with reference to FIG. 3.

Multiple SDS instances 14 included in each SDS node 10 are separated from each other for management and set individual users, access authority, and the like. As the SDS instances, Ceph instances managed as open source projects are used as an example.

Since each of the SDS instances 14 sets an individual user, access authority, and the like, each of the physical capacities 13 is a region included in a physical storage device and exclusively managed by a respective one of the SDS instances 14.

The capacity allocation/recovery system 20 is a computer (server) and includes a central processing unit (CPU), a memory, and a network interface card (NIC), which are not shown. The CPU executes a program stored in the memory, processes data stored in the memory, and controls the NIC.

In the memory of the capacity allocation/recovery system 20, shortage rate setting information 21, physical capacity allocation information 22 on each SDS node, and tenant-instance association information 23 are stored. A portion of the information 21, 22, and 23 may be temporarily stored in the memory in response to the execution of the program. The other portion of the information that is not stored in the memory may be stored in a nonvolatile storage device. The information 21, 22, and 23 is described later with reference to FIGS. 5, 6, and 7.

Figure 2:
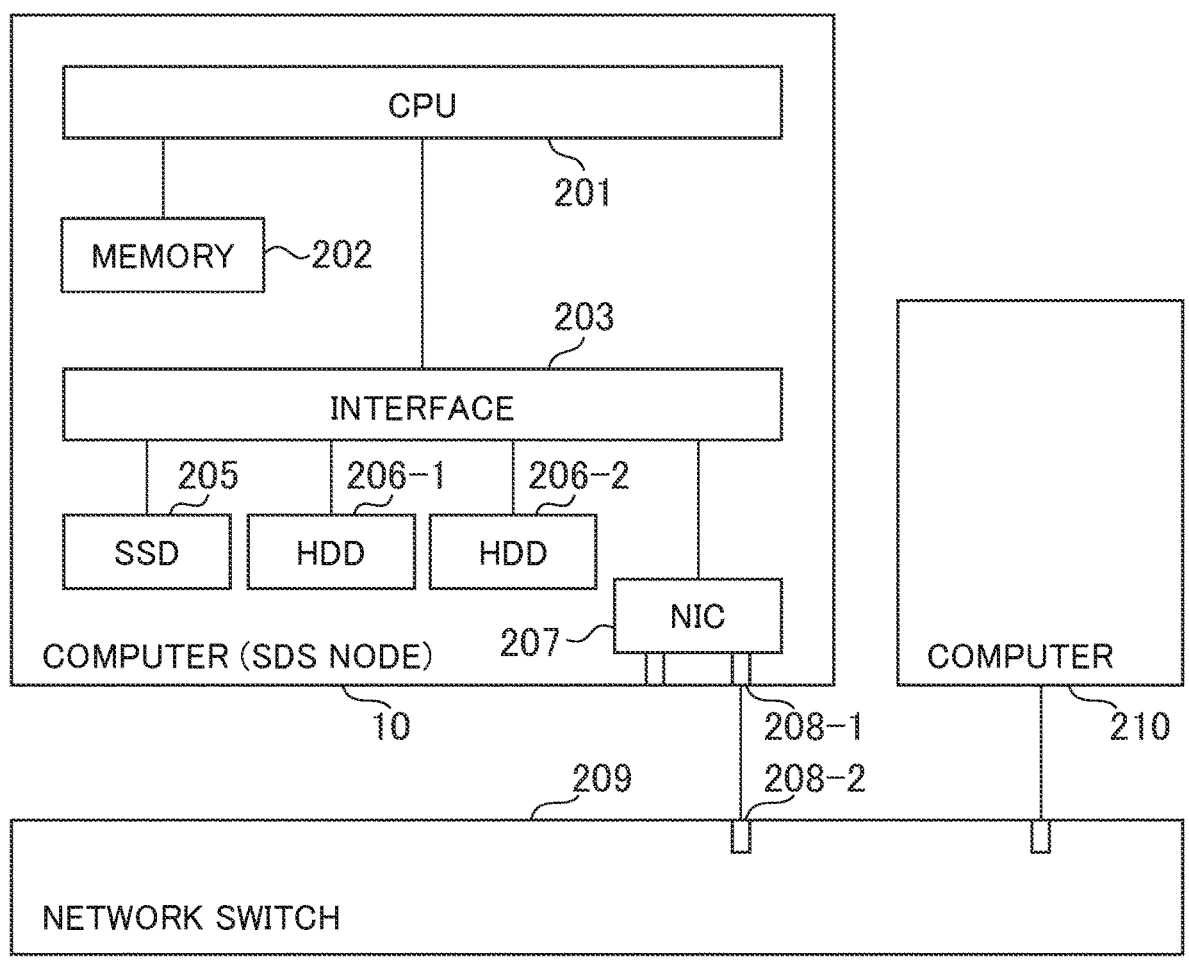
FIG. 2 is a diagram showing an example of an SDS node.

FIG. 2 shows an example of each SDS node 10. As shown in FIG. 2, the SDS node 10 is a general computer (server). A CPU 201 executes a program stored in a memory 202, processes data stored in the memory 202, and controls an NIC 207. A solid state drive (SSD) 205 and hard disk drives (HDDs) 206-1 and 206-2 are physical storage devices. In the SSD 205 and the HDDs 206-1 and 206-2, data (information) is stored. In the SSD 205 and the HDDs 206-1 and 206-2, programs may be stored.

The CPU 201 or the like may transfer data or a program between the memory 202 and the SSD 205 or the HDDs 206 and transfer data between the memory 202 and the NIC 207. Each of physical storage device groups 12 shown in FIG. 1 is composed of the SSD 205 and the HDDs 206. Since the NIC 207 communicates with a network, a port 208-1 is connected to a port 208-2 of a network switch 209.

The capacity allocation/recovery system 20 or a computer of a tenant may be connected as a computer 210 to the network switch 209. The NIC 207 of the SDS node 10 includes multiple ports and may be connected to a network switch other than the network switch 209.

Figure 3:
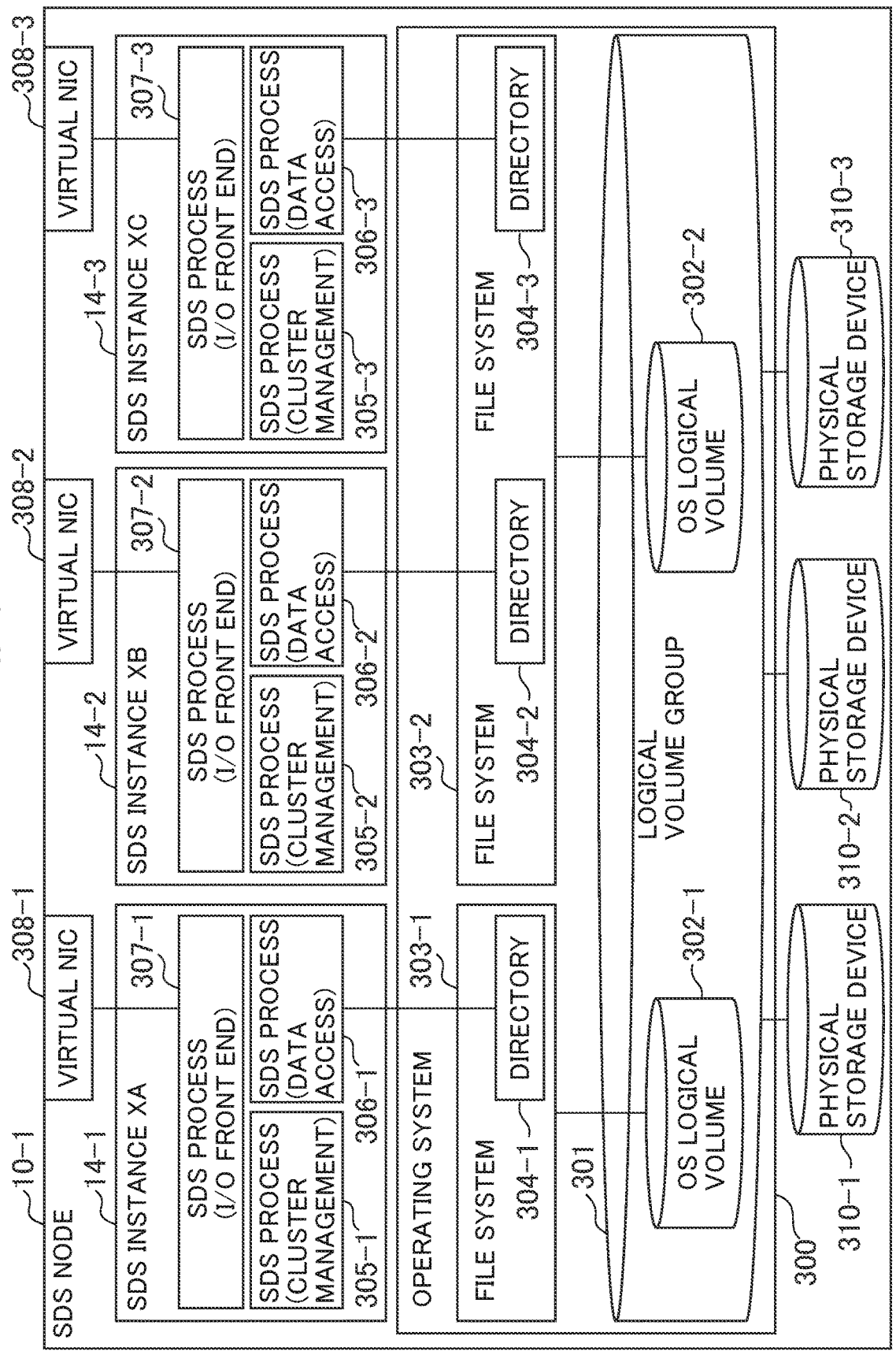
FIG. 3 is a diagram showing an example of SDS instances and physical capacities.

FIG. 3 shows an example of the SDS instances 14 and the physical capacities 13 used by the SDS instances 14. The example shown in FIG. 3 indicates the SDS node 10-1, but the SDS node 10-2 has the same configuration as the SDS node 10-1 shown in FIG. 3. Each SDS node 10 includes multiple physical storage devices 310. The physical storage devices 310 are the SSD 205 shown in FIG. 2 and the HDDs 206 shown in FIG. 2. The multiple physical storage devices 310 form a single logical volume group 301 based on a process of an operating system 300.

The logical volume group 301 includes multiple OS logical volumes 302. Each of the OS logical volumes 302 is managed by a respective one of file systems 303. Each of the file systems 303 includes one or multiple directories 304. Thus, a single directory 304-1 may be associated with a single OS logical volume 302-1. Multiple directories 304-2 and 304-3 may share a single OS logical volume 302-2.

The SDS instances 14 are executed as software programs (processes) executed on the operating system 300. Each of the SDS instances 14 includes an SDS process 305 for managing a cluster, an SDS process 306 for managing data access to the physical storage devices 310, and an SDS process 307 serving as a front end of I/O with a tenant.

The SDS process 305 may coordinate with an SDS process of the SDS instance 14-4 of the other SDS node 10-2 in order to manage the cluster. In addition, the NIC 207 shown in FIG. 2 serves as a virtual NIC 308 for each SDS process 307.

An SDS process 307-1 receives data access from a tenant via a virtual NIC 308-1, and an SDS process 306-1 executes data access to access a physical storage device 310 via the directory 304-1. Thus, the physical storage device 310 is used as a file system 303-1 via a function of the operating system 300.

Initial values of a capacity and region of the physical storage device 310 managed by the SDS process 306-1 are specified by setting upon the activation of the SDS instance 14-1 or the like. After that, the capacity and region of the physical storage device 310 managed by the SDS process 306-1 are managed and changed by the SDS instance 14-1 and the instance management agent 11-1.

In the example shown in FIG. 3, the SDS process 306-1 of the SDS instance 14-1 uses the file system 303-1 and the OS logical volume 302-1, while the SDS process 306-2 of the SDS instance 14-2 and the SDS process 306-3 of the SDS instance 14-3 use a file system 303-2 and an OS logical volume 302-2.

The tenant B to which the SDS instance 14-2 provides the storage function is different from the tenant C to which the SDS instance 14-3 provides the storage function. Thus, the OS logical volume 302-2 is used separately for the directory 304-2 and the directory 304-3. SDS logical volumes for the use are described below.

Figure 4:
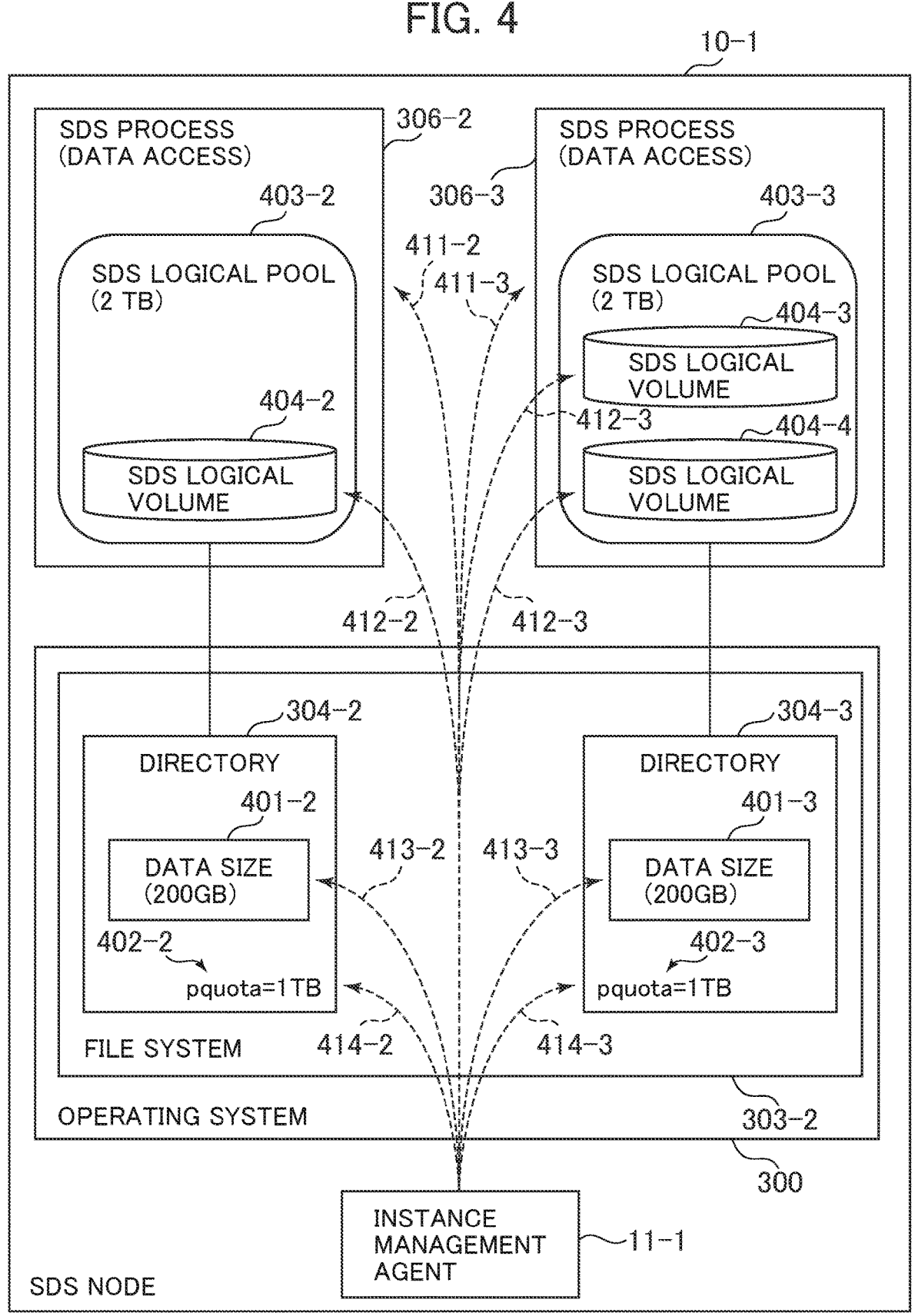
FIG. 4 is a diagram showing an example of the management of SDS processes and storage resources.

FIG. 4 shows an example of storage resources managed by the SDS processes 306. When an agreement with a tenant has newly been entered into, an SDS instance 14 is generated by an instance management agent 11 shown in FIG. 1. When the agreement has been entered into, the grade of the tenant or whether or not the agreement is a service level agreement (SLA) is registered in the physical capacity allocation information 22 on each SDS node in the capacity allocation/recovery system 20.

An SDS node 10 to be operated in a cluster and the number of SDS nodes 10 to be operated in a cluster configuration in which the multiple SDS nodes 10 exist are not defined in the embodiment. As an example, as an initial state, a single SDS node 10 is activated for a tenant and the number of SDS nodes 10 may be increased based on a storage capacity allocated in accordance with a request from the tenant (user) after the activation.

As another example, an SDS instance 14 set for a tenant in advance maybe executed in an SDS node 10 set to belong to a cluster, regardless of a dynamic request of the tenant. For example, when 10 SDS nodes 10 included in a cluster provide 5 services for a tenant, 5 SDS instances 14 are activated in each SDS node 10 for each tenant so that 50 SDS instances 14 are activated in total.

In the following description, execution is an example of the latter. A tenant to which a service that is an activated SDS instance 14 is provided is recorded in the tenant-instance association information 23 of the capacity allocation/recovery system 20.

FIG. 7 shows an example of the tenant-instance association information 23. Tenant identifiers 700 are identifiers of tenants to which the service is provided. Instances 701 of "SDS node X" are identifiers of SDS instances 14 to be executed in the SDS node 10-1. Instances 702 of "SDS node Y" are identifiers of SDS instances 14 to be executed in the SDS node 10-2.

Although not shown in FIG. 1, instances 703 having an identifier "SDS node Z" and identifying instances to be executed in an SDS node 10 exist. For example, when 10 SDS nodes 10 are set to form a cluster, the tenant-instance association information 23 includes identifiers of 10 SDS instances 14 for each tenant.

In the example shown in FIG. 7, the tenant having the identifier "tenant A" is associated with the SDS instance 14-1 having the identifier (I-XA ("SDS instance XA") and to be executed in the SDS node 10-1 having the identifier "SDS node X", and the like.

Return to FIG. 4. An instance management agent 11 extracts specific writing capacities from a file system (OS logical volume 302) generated in a physical storage device 310 of an SDS node 10 and allocates the specific writing capacities to SDS instances (SDS processes 306).

The allocation of the specific capacities can be achieved by a certain number of settings. In the embodiment, pquota values included in an XFS file system on Linux (registered trademark) are used. LVM, however, may be used for the allocation.

Specifically, the instance management agent 11-1 generates, in the file system 303-2, directories 304-2 and 304-3 able to be used by the SDS processes 306-2 and 306-3 and sets pquota values 402-2 and 402-3 for the directories 304-2 and 304-3 (arrows 414-2 and 414-3).

This prevents capacities exceeding the pquota values 402-2 and 402-3 from being added by the SDS processes 306-2 and 306-3 to the directories 304-2 and 304-3, and as a result, physical capacities 13-2 and 13-3 able to be used can be set.

An initial value of a pquota value 402 to be set for a single tenant (SDS instance 14 and SDS process 306) is determined and set by an instance management agent 11. The initial value may be a fixed value set in advance or may be a value equally allocated between multiple SDS processes 306 of a single SDS node 10.

The instance management agent 11-1 changes the pquota values 402-2 and 402-3 of the 2 SDS instances 14-2 and 14-3 (SDS processes 306-2 and 306-3) executed in the single SDS node 10-1, thereby achieving the interchange of the physical capacities 13-2 and 13-3.

For example, the interchange of the physical capacities 13-2 and 13-3 is achieved by reducing (recovering) the pquota value 402-2 of the SDS instance 14-2 (SDS process 306-2) by 200 GB and increasing (allocating) the pquota value 402-3 of the SDS instance 14-3 by 200 GB.

The SDS processes 306 activated (arrows 411-2 and 411-3) by the instance management agent 11-1 use the allocated directories 304 to manage SDS logical pools 403 to be used to generate one or more SDS logical volumes 404.

The SDS logical volumes 404 generated in the SDS logical pools 403 are accessed from another computing server (normal computer, virtual machine, or the like) via the SDS processes 306, and data is read and written from and to the SDS logical volumes 404 as normal volumes.

The SDS logical volumes 404 are disk functions reproduced in a software manner. An overcommit function can make the SDS logical volumes 404 appear as if the SDS logical volumes 404 virtually exist as volumes for a user without a physical capacity 13.

In FIG. 4, since the SDS processes 306 make the SDS logical volumes 404 (SDS logical pool 403) appear as if the SDS logical volumes 404 (SDS logical pools 403) exist in the SDS processes 306, but a region from and to which data is physically read and written is not included in each of the SDS processes 306.

When the SDS logical volumes 404-2 to 404-4 have capacities exceeding the physical capacities 13-2 and 13-3 and are provided, a thin provisioning function of allocating only regions that are included in regions of the SDS logical volumes 404-2 to 404-4 and to which data has actually been written to regions of the physical storage devices 310 is used.

When each of the physical capacities 13-2 and 13-2 is only 1 TB (or when each of the pquota values 402-2 and 402-3 is 1 TB), the SDS processes 306 can make regions (SDS logical pools 403-2 and 403-3) appear as if the regions have capacities of 2 TB.

Each of the SDS logical pools 403 may be at least one SDS logical volume included in the SDS logical pool 403. Thus, the size of the SDS logical volume 404-2 may be 2 TB. The total of the size of the SDS logical volume 404-3 and the size of the SDS logical volume 404-4 may be 2 TB.

The instance management agent 11-1 periodically monitors the total of the capacities of the SDS logical volumes 404-2 to 404-4 provided by the SDS processes 306-2 and 306-3 to a tenant (arrows 412-2 to 412-4) and monitors sizes (401-2 and 401-3) of data actually written (arrows 413-2 and 413-3).

Then, the instance management agent 11-1 monitors available capacities of the physical capacities 13-1 and 13-2 by subtracting the sizes 401-2 and 401-3 of the data actually written from the pquota values 402-2 and 402-3 allocated to the SDS processes 306-2 and 306-3.

In the embodiment, a shortage rate is defined as an index indicating the size of a capacity (unallocated capacity) that is not allocated to the actual physical capacity 13-3 (pquota value 402-3) and that is among the capacity or capacities of one or more of the SDS logical volumes 404-3 and 404-4 provided by the single SDS instance 14-3 (SDS process 306-3) to the tenant.

Thus, an equation for a shortage rate defined as an index is as follows.

The shortage rate=((the total of the sizes of SDS logical volumes 404 of a single SDS instance 14)−(a data size 401))/((a physical capacity (pquota value 402) allocated to the single SDS instance 14)−(the data size 401))−1 (when the shortage rate is expressed in percentage, the shortage rate is multiplied by 100)

When the shortage rate is high, the shortage rate indicates that as the amount of data written by a tenant to the SDS logical volumes 404 is increased, an empty space of the physical capacity 13 for storing the data is reduced and the probability at which the written data is deleted increases.

Especially, in a service for providing block storage, it is difficult to estimate a type of data to be written and estimate the time when a computer that uses an SDS logical volume 404 writes the data. In addition, index data of a file system 303 built in an OS logical volume 302 may be broken depending on the timing of writing the data, and data written to the SDS logical volume 404 before the writing of the data may be broken.

Thus, there may be a risk of unexpectedly losing data by unlimitedly executing overcommitment. It is desirable that an administrator of the storage service define, for each tenant, a degree of risk to be permitted in accordance with an SLA with each tenant, monitor shortage rates of the SDS instances 14, and adjust the physical capacities 13.

FIG. 5 is a diagram showing an example of the shortage rate setting information 21. In the shortage rate setting information 21, information on SLAs that affect overcommitment for each of tenants managed by the storage service. The information stored in the shortage rate setting information 21 is combinations of attribute values associated with the tenants and managed.

Tenant identifiers 500 are identifiers of the tenants to which the service is provided. Permitted shortage rates 501 are shortage rates permitted for the tenants. Each of grade groups 502 indicates a group of tenants that interchange the physical capacities 13.

For example, when a shortage rate of an SDS instance 14 that provides a service to a tenant belonging to "002" indicated in a column for the grade groups 502 exceeds a permitted shortage rate of the SDS instance 14, a capacity, which is included in a physical capacity 13 of an SDS instance 14 whose shortage rate is equal to or lower than a permitted shortage rate of the SDS instance 14 and that is among SDS instances 14 that provide services to the tenants belonging to "002" indicated in the column for the grade groups 502, is interchanged so that the capacity of the SDS instance 14 whose shortage rate exceeds the permitted shortage rate is increased.

Grade priorities 503 indicate priorities of the grade groups. For example, the following state is assumed. In the state, a capacity has been interchanged from an SDS instance 14 that provides a service to a tenant belonging to "002" indicated in the column for the grade groups 502 to an SDS instance 14 that provides a service to a tenant that has a priority lower than that of the group "002" and belongs to "003" indicated in the column for the grade groups 502.

In this state, when the shortage rate of the SDS instance 14 that provides the service to the tenant belonging to "002" indicated in the column for the grade groups 502 exceeds the permitted shortage rate of the SDS instance 14, the capacity interchanged in the past and provided to the SDS instance 14 that provides the service to the tenant belonging to "003" indicated in the column for the grade groups 502 is forcibly recovered and allocated. Remarks 504 are information having the same meanings as the grade priorities 503 and indicated by other expressions.

The information stored in the shortage rate setting information 21 may be set by causing a display device (not shown in FIGS. 1 and 2) and an input device (not shown in FIGS. 1 and 2) to display the items of the information and inputting values of the information. In addition, information of the values input in the displayed items may be a portion of the information stored in the shortage rate setting information 21.

FIG. 6 is a diagram showing an example of the physical capacity allocation information 22 on each SDS node 10. The physical capacity allocation information 22 on each SDS node 10 includes information of the physical capacities 13 allocated to the SDS instances 14 of each SDS node 10 or capacities of the physical capacities 13 allocated to each tenant. In this case, the capacities of the physical capacities 13 are pquota values 402.

Tenant identifiers 600 are identifiers of tenants to which the service is provided. Capacities 601 of "SDS node X" are the physical capacities 13-1 to 13-3 of the SDS node 10-1. Capacities 602 of "SDS node Y" are the physical capacities 13-4 to 13-6 of the SDS node 10-2. Although not shown in FIG. 6, the physical capacity allocation information 22 also includes capacities 603 of an SDS node 10 having an identifier "SDS node Z".

For example, in the example shown in FIG. 6, "50 GB" is allocated as the physical capacity 13-1 to the SDS node 10-1 having the identifier "SDS node X" for the tenant having the identifier "tenant A". In a range indicated in FIG. 6, 120 GB is provided by the 3 SDS nodes 10 to the tenant having the identifier "tenant A".

An instance management agent 11 periodically monitors usage statuses of SDS logical volumes 404 of SDS instances 14 and usage statuses of physical capacities 13 (pquota values 402) and calculates shortage rates. When the instance management agent 11 detects that a shortage rate exceeds a permitted shortage rate, the instance management agent 11 interchanges capacities of the physical capacities 13 between the SDS instances 14, thereby executing control so that overcommit ratios are in a specified range.

Thus, when a capacity used by a physical storage device 310 between tenants is temporarily biased, the operation management system can achieve an operation in which only data of a specific tenant does not fully use a capacity of another tenant having a high priority. This operation is defined as overcommit ratio adjustment operation.

Figure 8A:
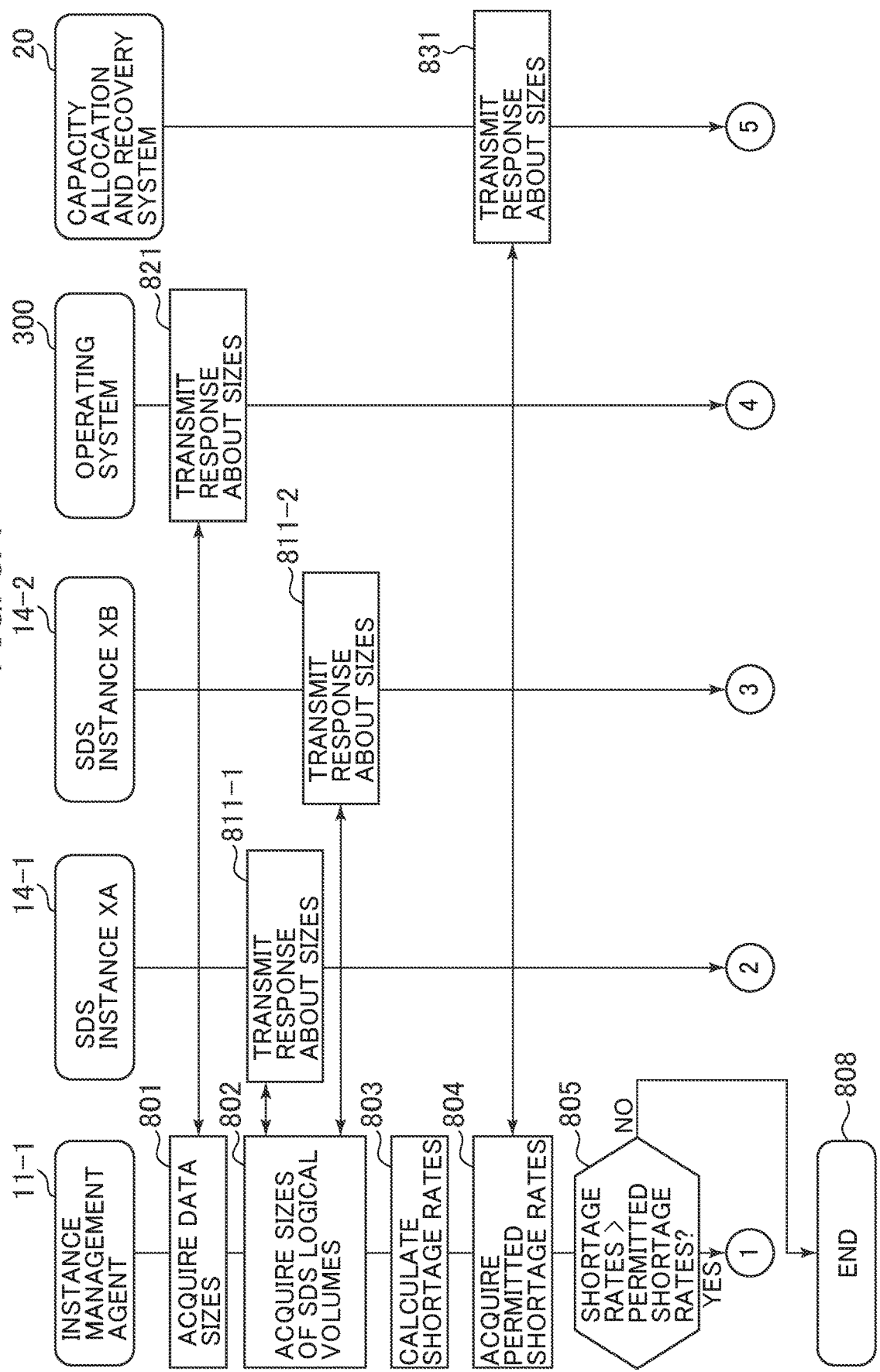
FIG. 8A is a diagram showing an example of a first sequence of an overcommit ratio adjustment operation.
Figure 8B:
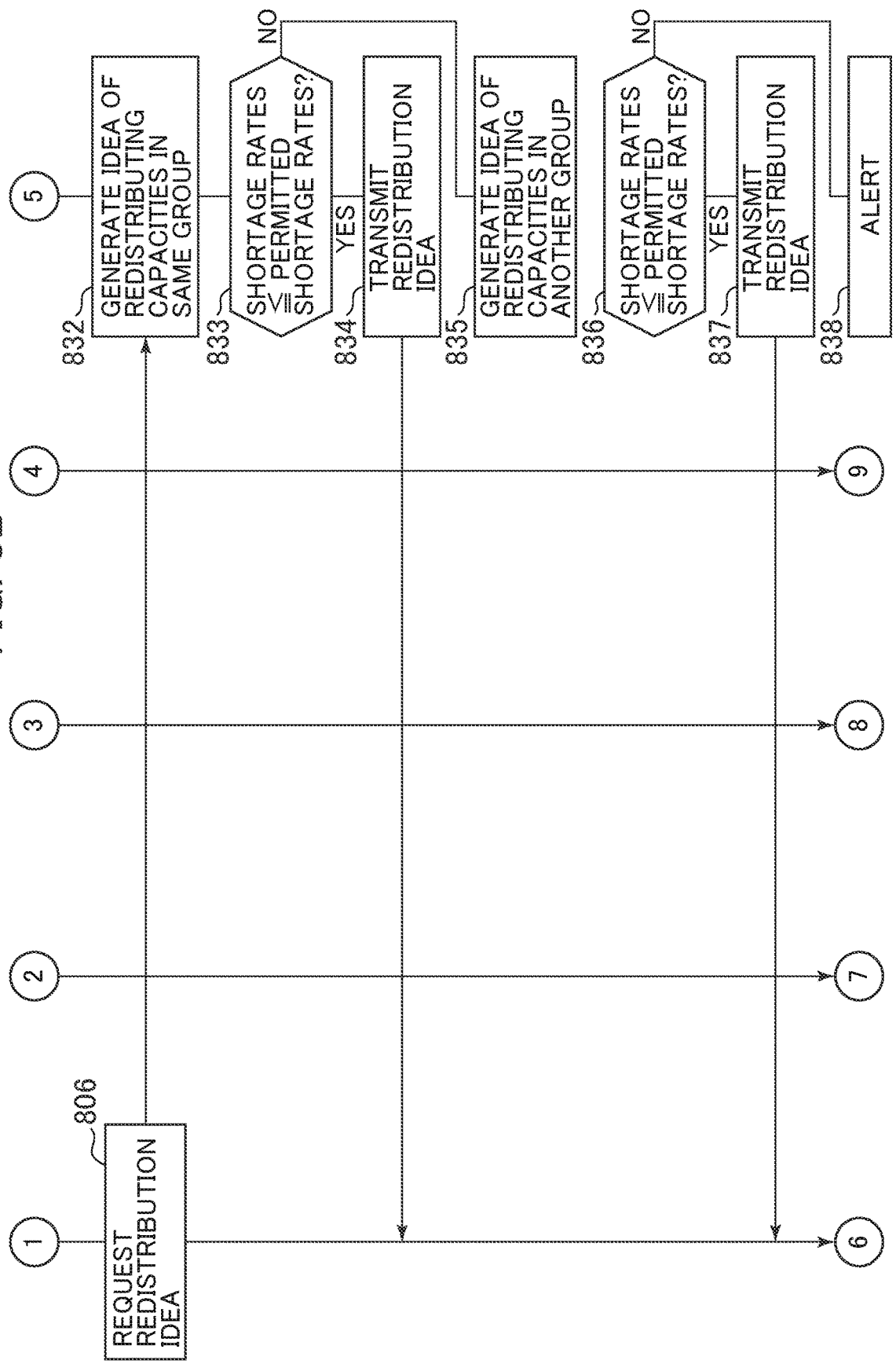
FIG. 8B is a diagram showing an example of a second sequence of the overcommit ratio adjustment operation.
Figure 8C:
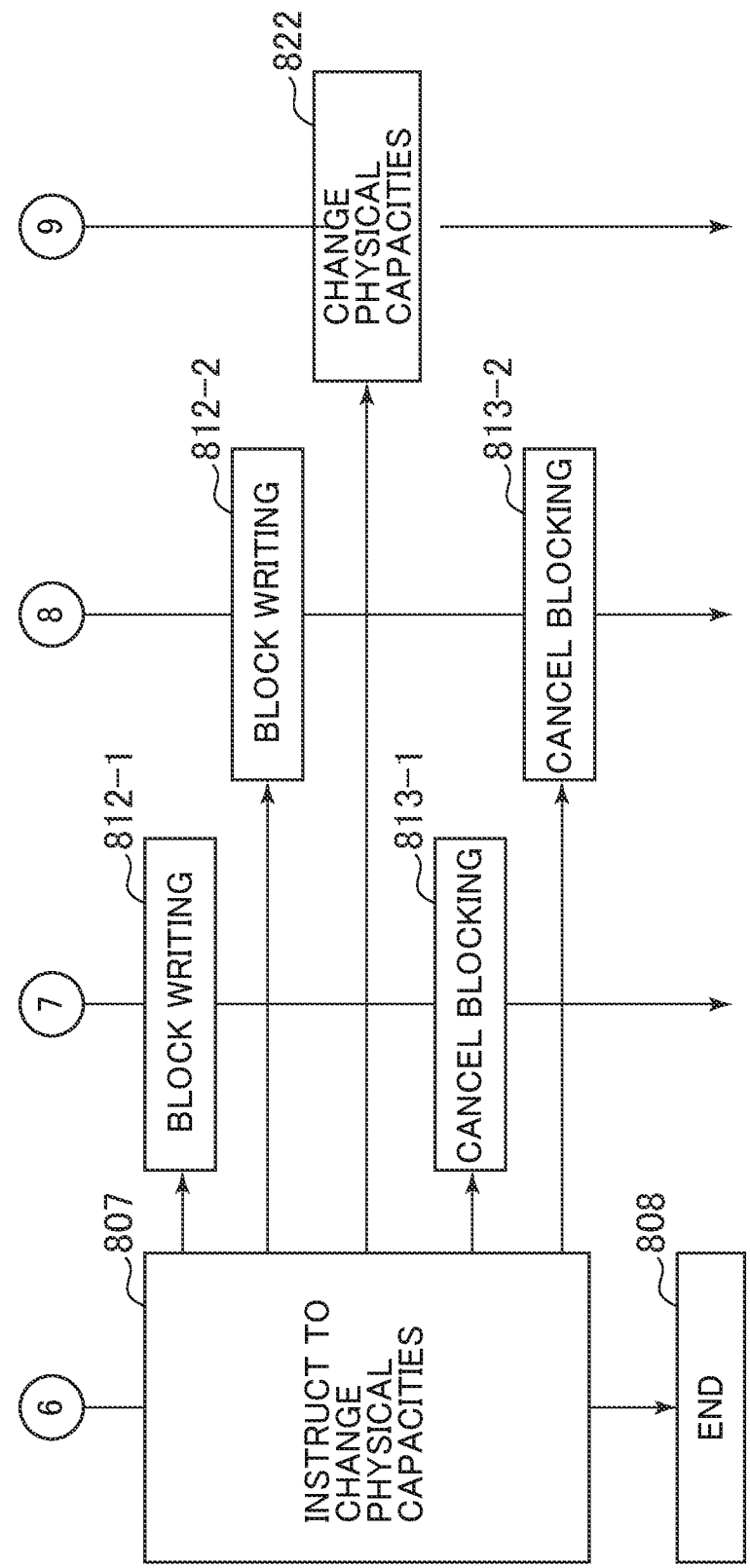
FIG. 8C is a diagram showing an example of a third sequence of the overcommit ratio adjustment operation.

An operation of the operation management system according to the embodiment is described below. FIGS. 8A to 8C are diagrams showing examples of process sequences in the overcommit ratio adjustment operation by the instance management agent 11-1 of the SDS node 10-1. In the examples shown in FIGS. 8A to 8C, the 2 SDS instances 14-1 and 14-2 exist, but another SDS instance 14 may exist.

The instance management agent 11-1 acquires, from the operating system 300, the sizes 401 of the data actually written to the directories 304 used by the SDS processes 306 of the SDS instances 14 executed in the SDS node 10-1 including the SDS instances 14-1 and 14-2 (in steps 801 and 821).

The pquota values 402 of the physical capacities 13 of the SDS node 10-1 including the physical capacities 13-1 and 13-2 are set by the instance management agent 11-1 and held by the instance management agent 11-1. The pquota values 402, however, may be reacquired from the operating system 300.

The instance management agent 11-1 acquires, from the SDS instances 14, the sizes of SDS logical volumes 404 provided to a tenant (as a cluster) by the SDS instances 14 executed in the SDS node 10-1 including the SDS instances 14-1 and 14-2 (in steps 802, 811-1, and 811-2).

Next, the instance management agent 11-1 calculates, from the acquired information, shortage rates of the SDS instances 14 of the SDS node 10-1 using the following equation (in step 803).

A shortage rate=((the total of the sizes of SDS logical volumes 404 of a single SDS instance 14)−(the data size 401)/(a physical capacity (pquota value 402) allocated to the single SDS instance 14))−(the data size 401))−1

The instance management agent 11-1 acquires permitted shortage rates 501 indicated in the shortage rate setting information 21 from the capacity allocation/recovery system 20 (in steps 804 and 831), compares values of the acquired permitted shortage rates 501 with the shortage rates calculated in step 803, and determines whether or not the calculated shortage rates exceed the values of the permitted shortage rates 501 (in step 805).

When the calculated shortage rates do not exceed the values of the permitted shortage rates 501 or when a shortage is not detected, the instance management agent 11-1 causes the process to proceed to step 808 to terminate the process.

When at least any of the calculated shortage rates exceeds a corresponding value among the values of the permitted shortage rates 501 or when a shortage is detected, the instance management agent 11-1 requests the capacity allocation/recovery system 20 to generate an idea of adjusting (redistributing) the physical capacities 13 (in step 806), as shown in FIG. 8B.

This request may include information of the sizes of the SDS logical volumes 404, the data sizes 401, and the pquota values 402. In addition, when the pquota values 402 are information received from the capacity allocation/recovery system 20, this request may not include the pquota values 402.

The capacity allocation/recovery system 20 generates the idea of a process of interchanging (redistributing) the physical capacities 13 (physical capacities 13 provided to tenants having the same value indicated in the column for the grade groups 502) in the same grade group in the same SDS node 10 (in step 832). This process is described later with reference to FIG. 9.

The capacity allocation/recovery system 20 determines whether or not the shortage rates are equal to or lower than the values of the permitted shortage rates 501 based on the idea generated in step 832 (in step 833). When the capacity allocation/recovery system 20 determines that the shortage rates are equal to or lower than the values of the permitted shortage rates 501 or a problem with the overcommit ratios is solved, the capacity allocation/recovery system 20 transmits, as a response to the request, the interchange distribution change idea (redistribution idea) generated in step 832 and including identifiers of SDS instances 14 of a capacity recovery destination and a capacity recovery source and the capacities (information on increases and reductions in the pquota values 402) (in step 834).

When the capacity allocation/recovery system 20 determines that the shortage rates are neither equal to nor lower than the values of the permitted shortage rates 501, or an SDS instance 14 that satisfies the requirement is not found, the capacity allocation/recovery system 20 generates an idea of interchanging the physical capacities 13 in a grade group and another grade group in the same SDS node 10-1 (in step 835). This process is described later with reference to FIG. 10.

The capacity allocation/recovery system 20 determines whether or not the shortage rates are equal to or lower than the values of the permitted shortage rates 501 based on the idea generated in step 835 (in step 836). When the capacity allocation/recovery system 20 determines that the shortage rates are equal to or lower than the values of the permitted shortage rates 501 or the problem with the overcommit ratios is solved, the capacity allocation/recovery system 20 transmits, as a response to the request, the interchange distribution change idea generated in step 835 and including identifiers of SDS instances 14 of a capacity recovery destination and a capacity recovery source and the capacities (in step 837).

When the capacity allocation/recovery system 20 determines that the shortage rates are neither equal to nor lower than the values of the permitted shortage rates 501 in step 836 or that a risk of a shortage of the capacities increases, the capacity allocation/recovery system 20 notifies an alert to an administrator of the operation management system (in step 838).

As shown in FIG. 8C, the instance management agent 11-1 instructs the operating system 300 to change the physical capacities 13 in accordance with the interchange distribution change idea received from the capacity allocation/recovery system 20 (in step 807). Then, the operating system 300 changes the physical capacities 13 in accordance with the instruction (in step 822).

The changes in the physical capacities 13 are achieved by increasing or reducing the pquota values 402, as described above with reference to FIG. 4. When a physical capacity 13 is accessed during the changes in the physical capacities 13, an operation of the access may not be guaranteed, and an instruction to temporarily stop the access may be included in the instruction in step 807.

The SDS instances 14-1 and 14-2 block writing in accordance with the instruction to temporarily stop the access from the instance management agent 11-1 (in steps 812-1 and 812-2) and cancel the blocking (in steps 813-1 and 813-2). When the changes in the physical capacities 13 are completed, the instance management agent 11-1 terminates the process (in step 808).

Figure 9:
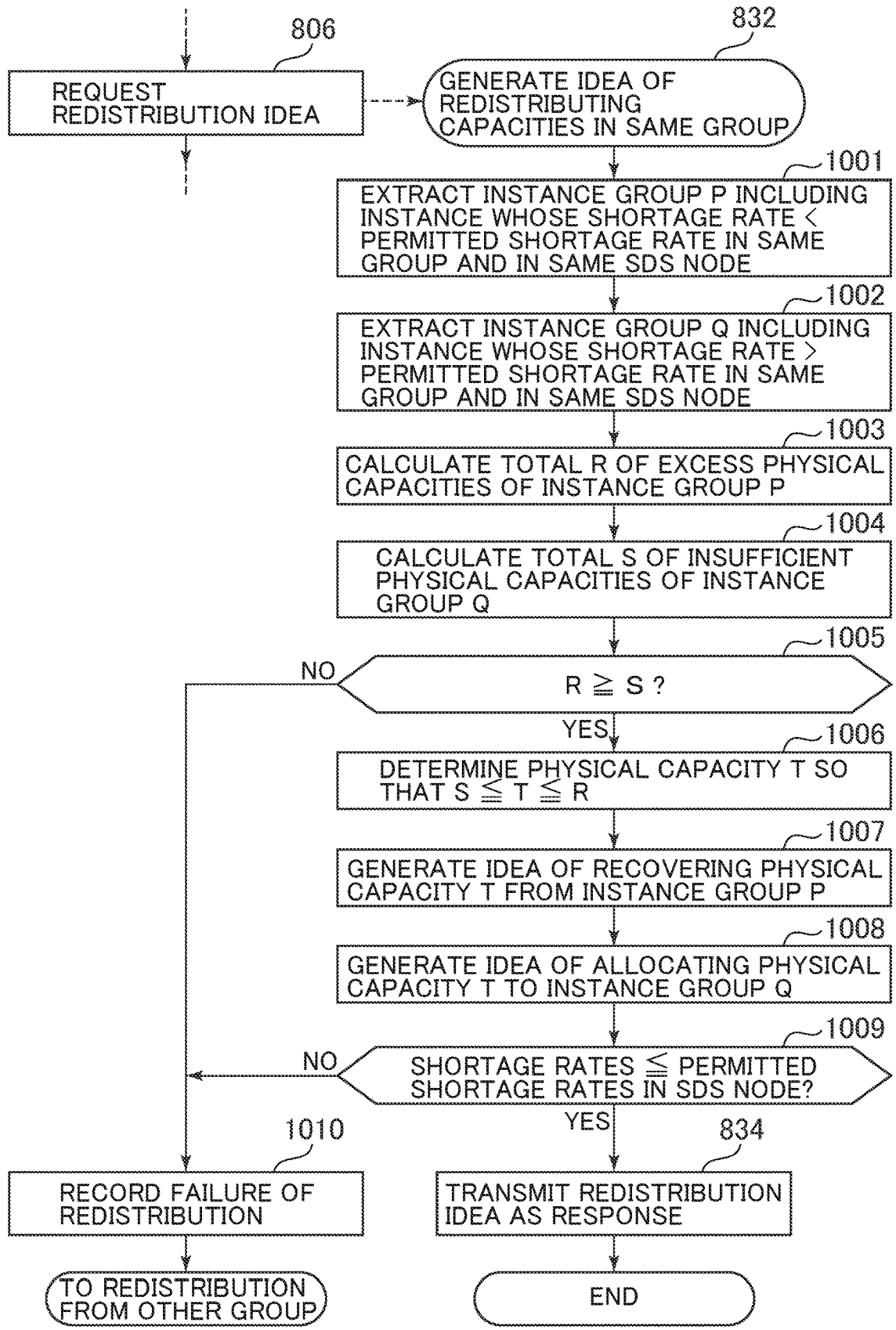
FIG. 9 is a diagram showing an example of a process of interchanging physical capacities in the same grade group.

FIG. 9 shows an example of a procedure for a process of interchanging the physical capacities in the same grade group. The example of the procedure corresponds to steps 832 to 834 described with reference to FIG. 8B. When the group is determined, a grade priority (grade) is also determined. Thus, the grade group may be merely referred to as group.

When the instance management agent 11-1 of the SDS node 10-1 requests the capacity allocation/recovery system 20 to generate the redistribution idea in step 806, the capacity allocation/recovery system 20 references the physical capacity allocation information 22 on each SDS node, the tenant-instance association information 23, and information indicating the SDS instances 14 and received from the instance management agent 11-1 that has requested the redistribution idea, and the capacity allocation/recovery system 20 acquires the permitted shortage rates of the SDS instances 14 of the SDS node 10-1 and calculates shortage rates.

Then, the capacity allocation/recovery system 20 extracts, for each grade group, at least one SDS instance 14 that is included in the same SDS node 10-1 and serves as an SDS instance group P and whose shortage rate is lower than a permitted shortage rate of the SDS instance 14 (in step 1001).

The following describes a single SDS instance group P of SDS instances 14 of a single (same) grade group. However, when SDS instances 14 are extracted from multiple grade groups in step 1001, steps 1002 to 1009 described below may be repeated for each of the grade groups.

The capacity allocation/recovery system 20 extracts an SDS instance group Q of SDS instances 14 that are included in the same grade group as the SDS instance group P extracted from the single grade group in step 1001 and are included in the same SDS node 10-1 and whose shortage rates are higher than permitted shortage rates of the SDS instances 14 (in step 1002).

The capacity allocation/recovery system 20 calculates, for each of the SDS instances 14 of the SDS instance group P, a physical capacity that causes a shortage rate of the SDS instance 14 to be equal to a permitted shortage rate of the SDS instance 14 when an excess physical capacity or a physical capacity is recovered (back calculation according to a calculation formula of an insufficient physical capacity), and the capacity allocation/recovery system 20 calculates the total R of the physical capacities calculated for the SDS instance group P (in step 1003).

In addition, the capacity allocation/recovery system 20 calculates, for each of the SDS instances 14 of the SDS instance group Q, an insufficient physical capacity or a physical capacity causing the shortage rate of the SDS instance 14 be equal to the permitted shortage rate of the SDS instance 14 upon the addition of the physical capacity and calculates the total S of the physical capacities calculated for the SDS instance group Q (in step 1004).

The capacity allocation/recovery system 20 compares the total R of the physical capacities with the total S and determines whether or not the total R≥the total S (in step 1005). When the requirement is satisfied or the total R≥the total S, the capacity allocation/recovery system 20 causes the process to proceed to step 1006. When the requirement is not satisfied or the total R<the total S, the capacity allocation/recovery system 20 causes the process to proceed to step 1010. The capacity allocation/recovery system 20 determines a physical capacity T to be recovered from the SDS instance group P and to be allocated to the SDS instance group Q (in step 1006).

The physical capacity T is a physical capacity that is recoverable from the SDS instance group P and is allocated to the SDS instance group Q to eliminate the shortage. Thus, the physical capacity T is determined so that the total S≤the physical capacity T≤the total R. As long as the total S≤the physical capacity T the total R, the physical capacity T may be an arbitrary value.

For example, the physical capacity T may be equal to the total S. However, since the amount of data may be increased, it is desirable that the physical capacity T be equal to min (the total S×an estimated increase rate of data during a time period of one day or less, the total R). min (I, J) is the minimum value between I and J.

The capacity allocation/recovery system 20 generates an idea of recovering the physical capacity T from the SDS instance group P (in step 1007) and generates an idea of allocating the physical capacity T to the SDS instance group Q (in step 1008). The recovery idea and the allocation idea are ideas of changing the pquota values.

The capacity allocation/recovery system 20 determines whether or not the shortage rates≤the permitted shortage rates for the SDS instances 14 of the same SDS node 10-1 (in step 1009). When the capacity allocation/recovery system 20 determines that the shortage rates≤the permitted shortage rates, the capacity allocation/recovery system 20 causes the process to proceed to step 834. The capacity allocation/recovery system 20 transmits, as a response, a redistribution idea including the recovery idea and the allocation idea (in step 834) and terminates the process. Step 834 shown in FIG. 9 corresponds to step 834 shown in FIG. 8B.

When the capacity allocation/recovery system 20 determines that the shortage rates>the permitted shortage rates, the capacity allocation/recovery system 20 causes the process to proceed to step 1010 and records a failure of the redistribution (in step 1010). When a recovery idea and an allocation idea are already generated, the capacity allocation/recovery system 20 discards the recovery idea and the allocation idea and causes the process to proceed to the generation (described with reference to FIG. 10) of an idea of redistributing physical capacities from another group.

When the SDS instances 14 are extracted from the multiple grade groups in step 1001, and an SDS instance 14 whose shortage rate is higher than a permitted shortage rate of the SDS instance 14 remains in a grade group that is not to be subjected to steps 1002 to 1009, the process may return to step 1002 based on the determination of step 1008.

In addition, the capacity allocation/recovery system 20 may determine that the physical capacity T cannot be determined in step 1009. When the physical capacity T cannot be determined, steps 1007 and 1008 may be skipped. The total R≥the total S. Thus, when the physical capacity T exists as a value but is a value that cannot be used for recovery and allocation due to a certain restriction, the capacity allocation/recovery system 20 may determine that the physical capacity T cannot be determined.

The process using the total R of the SDS instance group P and the total S of the SDS instance group Q is described above. Instead of the process, an excess physical capacity of the SDS instances 14 serving as the SDS instance group P maybe treated as R, an insufficient physical capacity of the SDS instances 14 serving as the SDS instance group Q may be treated as S, and the process may be executed.

Figure 10:
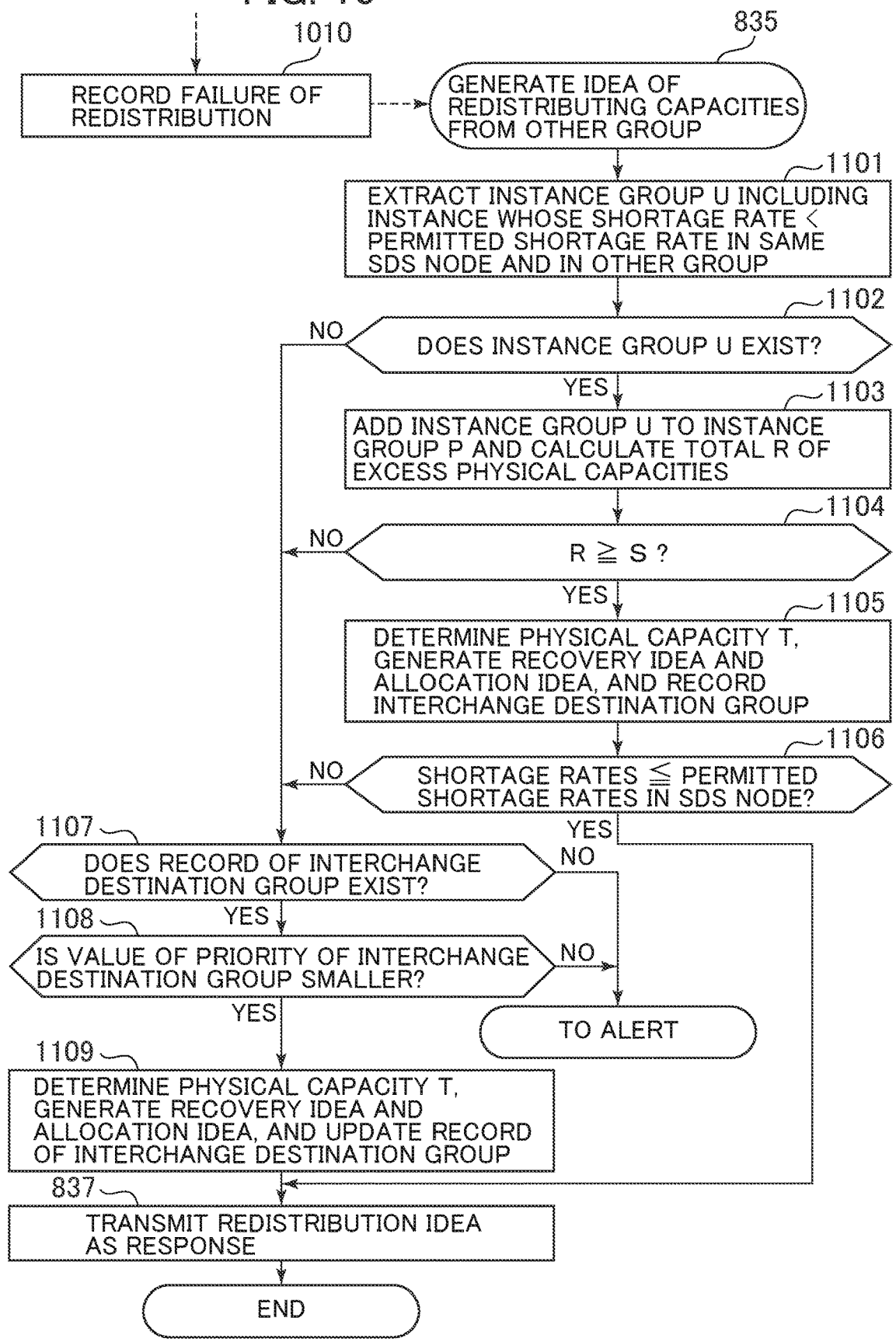
FIG. 10 is a diagram showing an example of a process of interchanging physical capacities included in a grade group and another grade group.

FIG. 10 is a diagram showing an example of a process of interchanging physical capacities included in a grade group and another grade group if the process, shown in FIG. 9, of interchanging capacities in the same graph group fails and the failure of the redistribution is recorded in step 1010. First, the capacity allocation/recovery system 20 extracts, from the other grade group included in the same SDS node 10-1, an SDS instance group U having an excess physical capacity and including an SDS instance whose shortage rate is lower than a permitted shortage rate of the SDS instance (in step 1101).

Then, the capacity allocation/recovery system 20 determines whether or not at least one SDS instance group U exists in step 1101 and whether or not the capacity allocation/recovery system 20 has extracted the at least one SDS instance group U in step 1101 (in step 1102). When the capacity allocation/recovery system 20 determines that the SDS instance group U does not exist, the capacity allocation/recovery system 20 causes the process to proceed to step 1107. When the capacity allocation/recovery system 20 determines that the SDS instance group U exists, the capacity allocation/recovery system 20 causes the process to proceed to step 1103.

The capacity allocation/recovery system 20 adds the SDS instance group U to the SDS instance group P extracted in step 1001 shown in FIG. 9, treats the multiple grade groups as a single virtual grade group, and calculates the total R of excess physical capacities of the SDS instance groups R and U (in step 1103).

Steps 1104 to 1106 correspond to steps 1005 to 1009 shown in FIG. 9. However, the capacity allocation/recovery system 20 treats, as an interchange destination grade group, a grade group including the SDS instance group Q and records the interchange destination grade group and the interchanged physical capacity T in an interchange record.

When an SDS instance 14 whose shortage rate is higher than a permitted shortage rate of the SDS instance 14 remains in a grade group that is not to be subjected to the processes of steps 1101 to 1105 in step 1106, the capacity allocation/recovery system 20 may cause the process to return to step 1101.

Then, when the capacity allocation/recovery system 20 determines that an SDS instance 14 that is included in the same SDS node 10-1 and whose shortage rate is equal to or lower than a permitted shortage rate of the SDS instance 14 exists in step 1106, the capacity allocation/recovery system 20 causes the process to proceed to step 837, transmits, as a response, a redistribution idea including the recovery idea generated in step 1105 and the allocation idea generated in step 1105, and terminates the process. Step 837 shown in FIG. 10 corresponds to step 837 shown in FIG. 8B.

On the other hand, when the capacity allocation/recovery system 20 determines that the process corresponds to a failure of the redistribution in step 1104 or step 1106, the capacity allocation/recovery system 20 causes the process to proceed to step 1107, references the interchange record, and determines whether or not a physical capacity of the grade group including the SDS instance group Q is interchanged to another grade group in the past.

When the capacity allocation/recovery system 20 determines that the physical capacity of the grade group is interchanged in step 1107, the capacity allocation/recovery system 20 causes the process to proceed to step 1108 and determines whether or not a value of a grade priority 503 of the interchange destination grade group to which the physical capacity of the grade group is interchanged is smaller than a value of a grade priority 503 of the grade group including the SDS instance group Q.

When the capacity allocation/recovery system 20 determines that the value of the grade priority 503 of the interchange destination grade group is smaller in step 1108, the capacity allocation/recovery system 20 causes the process to proceed to step 1109, determines the physical capacity T equal to or larger than the total S, generates an idea of recovering the physical capacity T from an SDS instance 14 of the interchange destination grade group whose value of the grade priority 503 has been determined to be smaller. Then, the capacity allocation/recovery system 20 generates an idea of allocating the physical capacity T to the SDS instance group Q and updates an interchange record of the interchange destination grade group.

However, in the process of determining the physical capacity T, an excess physical capacity of each SDS instance 14 of the interchange destination grade group is not required to be equal to or larger than the physical capacity T, and as a result, the physical capacity is forcibly recovered. When a pquota value 402 is smaller than the value of the size 401 of data due to the recovery of the physical capacity T, the written data is forcibly deleted.

In this case, the data may be deleted in units of SDS logical volumes 404, or deleted based on selection by the administrator of the operation management system or the like, or deleted in order from data whose last access time is earliest. Alternatively, data within a region that cannot be used due to implementation when a pquota value 402 is reduced may be deleted. The data may be deleted by the SDS node 10-1.

After step 1109, the capacity allocation/recovery system 20 transmits, as the response, the redistribution idea including the recovery idea generated in step 1105 and the allocation idea generated in step 1105 (in step 837) and terminates the process. In addition, when the capacity allocation/recovery system 20 determines that the interchange destination grade group cannot be used in step 1107 or 1108, the capacity allocation/recovery system 20 causes the process to proceed to step 838 shown in FIG. 8B and notifies an alert to the administrator of the operation management system.

As described above, the capacity allocation/recovery system 20 can calculate the shortage rates based on information monitored by instance management agents 11 and can recover and allocate the physical capacities 13 between the SDS instances 14 based on the calculated shortage rates.

The information monitored by the instance management agents 11 is information generally provided by the SDS instances 14 (SDS processes 306) and the operating system 300 (file systems 303). Information to be controlled is the general pquota values 402 (physical capacities 13) or control information of LVM. Thus, the storage service can be managed using an existing interface.

In addition, by recovering and allocating the physical capacities 13 between the SDS instances 14, the physical capacities 13 can be interchanged between the tenants. Based on the priority (grade) of the tenant, by interchanging the physical capacities 13 between tenants having the same priority or recovering the physical capacities 13 from a tenant having a low priority, an effect of data writing by the tenant having the low priority on a tenant that has a high priority and needs to secure a capacity can be suppressed.

In addition, by setting permitted shortage rates according to an SLA, the overcommit ratios that indicate ratios of the sizes of the SDS logical volumes 404 to the physical capacities 13 are substantially set. The shortage rates are adjusted so that the shortage rates do not exceed the set permitted shortage rates. Thus, the storage provision service in which the efficiency of using the physical capacities 13 is high can be achieved while the SLA is maintained.

What is claimed is:

1. An operation management system for providing a function of storage to a tenant and adjusting the provided function of the storage, comprising:
   a node that provides a logical volume of the storage to the tenant, receives writing of data to the logical volume from the tenant, and writes the received data to a region included in the storage and having a physical capacity allocated to the tenant; and
   a capacity allocation and recovery system that determines a physical capacity to be interchanged, based on the size of the logical volume, the size of the written data, and the physical capacity allocated to the tenant, and notifies information on the determined physical capacity to the node, wherein the node transmits the size of the logical volume and the size of the written data to the capacity allocation and recovery system, and wherein the capacity allocation and recovery system receives the size of the logical volume and the size of the written data from the node and stores the size of the logical volume and the size of the written data.

2. The operation management system according to claim 1, wherein the node provides, to the tenant, a logical volume larger than the physical capacity allocated to the tenant.

3. The operation management system according to claim 2, wherein the node provides multiple logical volumes of the storage as a logical pool to the tenant, receives writing of multiple data items to the multiple logical volumes from the tenant, and writes the received multiple data items to a region included in the storage and having the physical capacity allocated to the tenant.

4. The operation management system according to claim 3,
wherein the capacity allocation and recovery system stores a set permitted shortage rate and transmits the stored permitted shortage rate to the node,
wherein the node divides a first value obtained by subtracting the total size of the written multiple data items from the total of the sizes of the multiple logical volumes by a second value obtained by subtracting the total size of the written multiple data items from the physical capacity allocated to the tenant, and calculates a shortage rate by subtracting a value of 1 from a value obtained by dividing the first value by the second value, and
wherein when the node determines that the calculated shortage rate exceeds the permitted shortage rate received from the capacity allocation and recovery system, the node transmits a redistribution request to the capacity allocation and recovery system.

5. The operation management system according to claim 4,
wherein the operation management system provides functions of the storage to multiple tenants, and
wherein when the capacity allocation and recovery system receives the redistribution request from the node, the capacity allocation and recovery system:
calculates an excess physical capacity for a first tenant among the multiple tenants so that the excess physical capacity causes a shortage rate to be lower than a permitted shortage rate;
calculates an insufficient physical capacity for a second tenant among the multiple tenants so that the insufficient physical capacity causes a shortage rate to exceed a permitted shortage rate; and
determines a physical capacity to be interchanged, based on the calculated excess physical capacity and the calculated insufficient physical capacity, recovers the determined physical capacity from a physical capacity allocated to the first tenant, generates information to be allocated to a physical capacity allocated to the second tenant, and notifies the generated information as a response to the redistribution request to the node.

6. The operation management system according to claim 5, further comprising multiple nodes,
wherein the nodes provide functions of the storage to the first and second tenants belonging to a first group and included in the multiple tenants,
wherein a first node among the multiple nodes executes a first instance on the first tenant and executes a second instance on the second tenant,
wherein the first instance provides a first logical volume of the storage to the first tenant, receives writing of first data to the first logical volume from the first tenant, and writes the received first data to a region included in the storage and having a first physical capacity allocated to the first tenant,
wherein the second instance provides a second logical volume of the storage to the second tenant, receives writing of second data to the second logical volume from the second tenant, and writes the received second data to a region included in the storage and having a second physical capacity allocated to the second tenant, and
wherein when the capacity allocation and recovery system receives the redistribution request, the capacity allocation and recovery system:
calculates an excess physical capacity of the first instance that is executed for the first tenant belonging to the first group in the first node and whose shortage rate is lower than a permitted shortage rate of the first instance;
calculates an insufficient physical capacity of the second instance that is executed for the second tenant belonging to the first group in the first node and whose shortage rate exceeds a permitted shortage rate of the second instance; and
determines, when the capacity allocation and recovery system determines that the calculated excess physical capacity is equal to or larger than the calculated insufficient physical capacity, a physical capacity to be interchanged, based on the calculated excess physical capacity and the calculated insufficient physical capacity, recovers the determined physical capacity from the first physical capacity of the first instance, generates information to be allocated to the second physical capacity of the second instance, and notifies the generated information as a response to the redistribution request to the first node.

7. The operation management system according to claim 6,
wherein the operation management system provides a function of the storage to a third tenant belonging to a second group and included in the multiple tenants,
wherein the first node executes a third instance on the third tenant,
wherein the third instance provides a third logical volume of the storage to the third tenant, receives writing of third data to the third logical volume from the third tenant, and writes the received third data to a region included in the storage and having a third physical capacity allocated to the third tenant, and
wherein when the capacity allocation and recovery system receives the redistribution request, the capacity allocation and recovery system:
calculates the excess physical capacity of the first instance;
calculates the insufficient physical capacity of the second instance;
calculates, when the capacity allocation and recovery system determines that the calculated excess physical capacity is smaller than the calculated insufficient physical capacity and that the third instance whose shortage rate is lower than a permitted shortage rate of the third instance and that is executed for the third tenant belonging to the second group in the first node exists, excess physical capacities of the first and third instances; and
determines, when the capacity allocation and recovery system determines that the calculated excess physical capacities of the first and third instances are equal to or larger than the calculated insufficient physical capacity of the second instance, a physical capacity to be interchanged, based on the calculated excess physical capacities of the first and third instances and the calculated insufficient physical capacity of the second instance, generates information to be allocated by recovering the determined physical capacity, records the first group as an interchange destination group, and notifies the generated information to be allocated by the recovery as a response to the redistribution request to the first node.

8. The operation management system according to claim 7, wherein the operation management system provides the functions of the storage to the first and second tenants included in the multiple tenants and belonging to the first group having a priority added thereto, wherein the operation management system provides a function of the storage to a fourth tenant included in the multiple tenants and belonging to a third group having a priority added thereto, wherein the first node executes a fourth instance on the fourth tenant, wherein the fourth instance provides a fourth logical volume of the storage to the fourth tenant, receives writing of fourth data to the fourth logical volume from the fourth tenant, and writes the received fourth data to a region included in the storage and having a fourth physical capacity allocated to the fourth tenant, and wherein when the capacity allocation and recovery system:

determines that the calculated excess physical capacity of the first instance is smaller than the calculated insufficient physical capacity of the second instance;

determines that the third instance whose shortage rate is lower than a permitted shortage rate of the third instance and that is executed for the third tenant belonging to the second group in the first node does not exist;

determines that the interchange destination group is already recorded; and determines, when the capacity allocation and recovery system determines that the priority of the third group recorded as the interchange destination group is lower than the priority of the first group, a physical capacity to be interchanged, based on the calculated insufficient physical capacity of the second instance, recovers the determined physical capacity from the third physical capacity of the third instance, generates information to be allocated to the second physical capacity of the second instance, and notifies the generated information as a response to the redistribution request to the first node.

9. The operation management system according to claim 8, wherein when the capacity allocation and recovery system determines that the third instance whose shortage rate is lower than the permitted shortage rate of the third instance and that is executed for the third tenant belonging to the second group in the first node does not exist, and when the capacity allocation and recovery system determines that the interchange destination group is not recorded or that the priority of the third group recorded as the interchange destination group is not lower than the priority of the first group, the capacity allocation and recovery system notifies an alert to an administrator.

10. An operation management method for adjusting a function included in storage and provided by a capacity allocation and recovery system and a node that provides the function of the storage to a tenant, wherein the node provides a logical volume of the storage to the tenant, receives writing of data to the logical volume from the tenant, and writes the received data to a region included in the storage and having a physical capacity allocated to the tenant, and wherein the capacity allocation and recovery system determines a physical capacity to be interchanged, based on the size of the logical volume, the size of the written data, and the physical capacity allocated to the tenant, and notifies information on the determined physical capacity to the node, wherein the node transmits the size of the logical volume and the size of the written data to the capacity allocation and recovery system, and wherein the capacity allocation and recovery system receives the size of the logical volume and the size of the written data from the node and stores the size of the logical volume and the size of the written data.

11. The operation management method according to claim 10, wherein the node provides, to the tenant, a logical volume larger than the physical capacity allocated to the tenant.

12. The operation management method according to claim 11, wherein the node provides multiple logical volumes of the storage as a logical pool to the tenant, receives writing of multiple data items to the multiple logical volumes from the tenant, and writes the received multiple data items to a region included in the storage and having the physical capacity allocated to the tenant.

13. The operation management method according to claim 12, wherein the capacity allocation and recovery system stores a set permitted shortage rate and transmits the stored permitted shortage rate to the node, wherein the node divides a first value obtained by subtracting the total size of the written multiple data items from the total of the sizes of the multiple logical volumes by a second value obtained by subtracting the total size of the written multiple data items from the physical capacity allocated to the tenant, calculates a shortage rate by subtracting a value of 1 from a value obtained by dividing the first value by the second value, and wherein when the node determines that the calculated shortage rate exceeds the permitted shortage rate received from the capacity allocation and recovery system, the node transmits a redistribution request to the capacity allocation and recovery system.

* * * * *